Jan. 14, 1958  O. ABRAMSON ET AL  2,819,499
BLIND UNIT
Filed Dec. 22, 1953
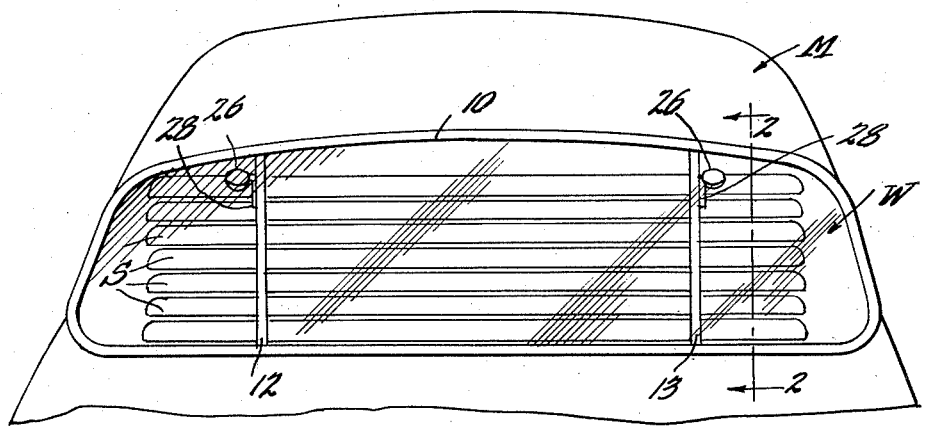
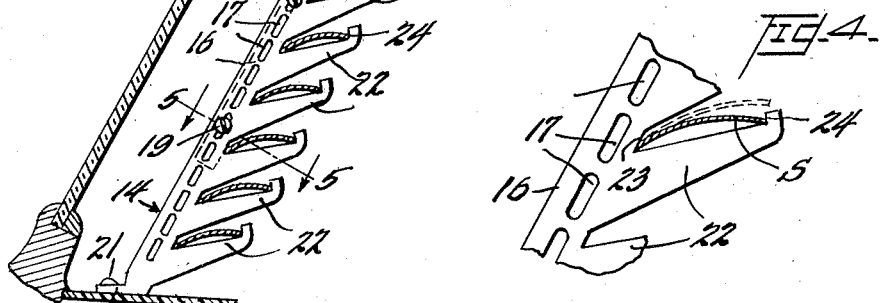
INVENTORS
Oscar Abramson
Stephen Abramson,
BY Leon Simon
ATTORNEY

2,819,499
BLIND UNIT

Oscar Abramson and Stephen Abramson, Baltimore, Md.

Application December 22, 1953, Serial No. 399,666

2 Claims. (Cl. 20—63)

The present invention relates to a blind unit for windows and the like.

More particularly the present invention relates to a blind unit provided with a plurality of slats which may be easily adjusted to a plurality of lengths, and which may be supported adjacent various window openings such as the rear window opening of automobiles, club cellar windows, transoms and the like and which may be also utilized as a store front valance.

The modern automobile with its large expanse of curved rear glass presents a considerable problem in shading the passengers in the rear seat of such a vehicle from the effects of sunlight. Although it has previously been proposed to provide this window with valances, shades and other contrivances, because of the varying width of such rear windows and the curvature it has been difficult to provide a unit capable of being universally used in various automotive vehicles. Heretofore, blinds for this purpose have been custom made to fit the curvature of the rear window and have been fastened to the beads circumscribing the window so that they are closely adjacent the glass. Such blind units have been relatively expensive since they represented largely a hand operation.

It is one of the objects of the present invention to provide a blind unit and especially a blind unit for the rear window of an automotive vehicle which is capable of being adjusted to fit adjacent such rear window in any conventional type automotive vehicle.

A second object of the present invention is to provide in a blind unit of the type described a plurality of supporting means each provided with overlapping portions which may be telescoped in order to adjust the height of such supporting means, these means being especially arranged to fixedly retain a plurality of slats.

A third object of the present invention is to provide in a blind unit of the character described a pair of overlapping supporting means including flat strip members having a plurality of openings and means extending through these openings whereby the slat supporting members may be adjustably lengthened or shortened.

A fourth object of the present invention is to provide in a blind unit for windows and the like a pair of spaced slat supporting members having a foot at the lower end thereof adapted to be supported on the generally horizontal fiber rear ledge between the back of the rear seat of an automobile and the rear window, and further provided with an adjustably positioned suction cup which serves to support the upper end of the blind unit.

Other objects and advantages of the present invention will become apparent from the subsequent description and figures of the drawing wherein:

Figure 1 is a rear elevation of a portion of an automotive vehicle showing the novel blind unit of the present invention installed therein.

Figure 2 is a vertical section taken generally along the line 2—2 of Figure 1.

Figure 3 is a detail section taken generally along the line 3—3 of Figure 2.

Figure 4 is an enlarged detail of a portion of the device as shown in Figure 2.

Figure 5 is a section taken generally along the line 5—5 of Figure 2.

Figure 6 is an enlarged detail of a bracket forming part of the present invention.

Referring to the figures of the drawing, the automotive vehicle designated generally at M is provided with the rear window of conventional structure designated generally at W. As best shown in Figure 2 the window W is set into the body of the vehicle as by means of a conventional bead diagrammatically shown at 10. The vehicle is also conventionally provided with a rear ledge of fiberboard indicated at 11 which may be suitably fastened in a conventional manner between the rear seat and the rear window of the vehicle M.

The blind unit of the present invention includes a pair of supporting members indicated generally at 12 and 13. As best shown in Figure 2 each of the supporting members as for example the member 13 is provided with a lower portion 14 and an upper portion 15 and as shown the lower portion 14 overlaps the upper portion 15 for a substantial distance. Each of the upper and lower portions is of angular shape as best shown in Figures 3 and 5 and is provided with a flat strip portion 16 having holes 17 therein.

When the two members 14 and 15 are assembled and overlapped they may be secured together to provide a unit of any length by the bolts 18 and 19. The lower end of the member 14 is provided with a foot 20 having an opening therein adapted to receive the screw 21 whereby the foot may be fastened to the rear ledge 11. Projecting rearwardly from the members 14 and 15 are a plurality of arms 22 provided with a pair of shoulder portions 23 and 24 spaced a distance apart sufficient to receive and hold in position the slats indicated at S. As may be understood the shoulders 23 and 24 are so spaced that the slats S which may be of metal or plastic have to be laterally compressed in order to insert them between the shoulders 23 and 24 and the spring tension of the slats serves to secure them between the two shoulders. The condition of the slats prior to insertion is indicated in dotted lines in Figure 4. It may be noted further that the slots or openings 17 in each of the portions 14 and 15 are so positioned in these portions that when the slots coincide the arms 22 positioned on each of the portions 14 and 15 will also coincide. Otherwise the out-of-phase relation between the arms 22 on one of the portions 14 and on the other portion 15 would prevent insertion of the slat between the respective shoulders 23 and 24.

A suction cup 26 is provided which is adapted to be fastened in a conventional manner to the window W. The rear end of the suction cup is provided with a bolt adapted to project through an opening in the bracket 28, the bracket in turn being provided with holes 29 and 30 so that it may be adjustably secured to the upper end of the portion 15 as by the bolt 31.

There has therefore been provided in accordance with the present invention a novel blind unit which may be assembled with the rear window of an automotive vehicle of any type irrespective of the curved configuration thereof. The device is so arranged that the slats S when in proper position do not interfere with the vision through the window but do prevent the sun from disturbing the occupants of the rear seat thereof.

In assembling the device and fastening the same in position in an automotive vehicle the suction cup 26 is first positioned adjacent the upper edge of the window and to one side thereof and the foot member 20 is then screwed in position on the rear ledge 11 below the suction cup position. The two telescoping portions 14 and 15 are then adjusted so that the length of the entire supporting member 13 is about the height of the window W. The bolt 31 is then placed through an appropriate hole in the bracket 28 and in the strip member 15, thus properly positioning the supporting member 13 adjacent the window. A similar operation is then performed with the supporting member 12 and all that remains to be done is to insert the slats S by flexing the same. Since the slats S are preferably made of thin material they may be readily cut with a shears to approximately cover the opening as shown in Figure 1.

As may be understood each portion of the supporting members may be stamped in its entirety from a single sheet of metal or may be suitably formed from a conventional plastic material. In either event the arms 22 are preferably integral with the remainder of the portions 14 and 15.

In Figure 6 there is shown a bracket 28 prior to assembly with the supporting members. In this condition the bracket 28 is provided with several additional slots 33 and it will be noted that several score lines 34 are provided between each slot. In assembly therefore the bracket 28 may be shortened to fit by breaking the same at the score lines. By this means the end of the bracket is prevented from interfering with the insertion of a slat against the adjacent shoulder 23.

We claim:

1. A blind unit for windows and the like comprising, a plurality of slats, a pair of spaced slat supporting members, each including a plurality of overlapping portions having openings therein, a plurality of arms having slat retaining means thereon extending from said portions, said openings being so arranged that respective openings and arms on each of an overlapping portion simultaneously coincide, and means at the upper and lower end of each of said supporting means for retaining said supporting means in position adjacent a window.

2. A blind unit for windows and the like comprising, a plurality of slats, a pair of spaced slat supporting members, each including a plurality of overlapping portions having openings therein, a plurality of arms having slat retaining means thereon extending from said portions, said openings being so arranged that respective openings and arms on each of an overlapping portion simultaneously coincide, a foot member extending laterally from the lower end of each of said supporting members, suction cups adjacent the upper end of each of said supporting members and means for supporting the upper end of each of said supporting members from said suction cups.

References Cited in the file of this patent

UNITED STATES PATENTS

| | | |
|---|---|---|
| 2,349,470 | Stanfield | May 23, 1944 |
| 2,485,263 | Digby | Oct. 18, 1949 |
| 2,561,188 | Ferguson | July 17, 1951 |